(12) United States Patent
Dobrowski et al.

(10) Patent No.: US 6,330,517 B1
(45) Date of Patent: Dec. 11, 2001

(54) INTERFACE FOR MANAGING PROCESS (75) Inventors: Partick Dobrowski, Burnsville; Jon Westbrock, Eagan, both of MN (US); Kenneth L. Holladay, San Antonio, TX (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/397,942

(22) Filed: Sep. 17, 1999

(51) Int. Cl.[7] .............................. G06F 13/00; G06F 19/00
(52) U.S. Cl. ..................... 702/104; 702/109; 709/232; 709/316; 709/321; 710/11; 710/21; 710/106
(58) Field of Search ............................. 702/85, 104, 109, 702/121–122, 186; 709/230, 232, 316, 321, 327; 710/5, 8, 11, 15, 20–21, 104–106

(56) References Cited

U.S. PATENT DOCUMENTS

| 5,586,324 | * | 12/1996 | Sato et al. | 710/10 |
| 5,598,521 | | 1/1997 | Kilgore et al. | 395/326 |
| 5,796,602 | | 8/1998 | Wellan et al. | 364/130 |
| 5,828,851 | | 10/1998 | Nixon et al. | 395/285 |
| 5,903,455 | | 5/1999 | Sharpe, Jr. et al. | 364/188 |
| 5,960,214 | * | 9/1999 | Sharpe, Jr. et al. | 709/315 |
| 6,094,600 | * | 7/2000 | Sharpe, Jr. et al. | 702/187 |

FOREIGN PATENT DOCUMENTS

WO 97/29409    8/1997   (WO) .

OTHER PUBLICATIONS

Holladay et al., "Specification for Field Calibrator Interface", Southwest Research Institute, Mar. 25, 1999.

* cited by examiner

*Primary Examiner*—Marc S. Hoff
*Assistant Examiner*—Bryan Bui
(74) *Attorney, Agent, or Firm*—Judson K. Champlin; Westman, Champlin & Kelly (57) ABSTRACT

An improved interface is established between a field management system and a calibrator for calibrating a process device to provide increased efficiency. The interface includes a communication module for communicating with the calibrator in accordance with a calibrator-specific protocol and a translation module for translating calibration information between an FMS-compatible format and a common data format. The interface allowing calibration information to flow between the calibrator and the FMS.

22 Claims, 5 Drawing Sheets

INTERFACE FOR MANAGING PROCESS

BACKGROUND OF THE INVENTION

Typically, process plants, such as chemical refinery plants, include many field devices, that control and measure parameters within the process. A field device can be a control device such as a valve controller or a measurement device such as a temperature or flow transmitter. The field device can be coupled to a communication bus such that the devices can communicate to a remote location such as a control room.

Field management systems are software packages, run on computers typically located at remote locations such as in the control room, used to manage the field devices. One such software package, Asset Management Solutions™, is available from Fisher-Rosemount. The field management system generally utilizes several software modules, each configured to perform different functions. The field management system maintains a database containing information related to each field device and is capable of communicating with the field devices using the communication bus.

Calibrators and calibrator management systems are used to calibrate the field devices. A calibrator is typically a portable unit, which can be carried into the field and coupled to the field device. The calibrator performs a number of tests on the field device to determine the accuracy of the device. The test results can be used to adjust the field device in order to optimize performance. Test definitions or testing data containing instructions for calibrating a specific field device must be loaded into the calibrator before a device can be tested. The calibrator management system is a software package typically run on a computer which contains a proprietary, non-standard, database of the test definitions needed by the calibrator to test the field devices. The calibrator management system downloads the test definitions into the calibrator. Furthermore, the results of a calibration can be uploaded from the calibrator back into the CMS. However, typical field management systems have not been able to efficiently interface with field calibrators.

SUMMARY

A data interface is established between a field management system and a calibrator to provide increased efficiency. The data interface includes a communication module for communicating with the calibrator in accordance with a calibrator-specific protocol and a translation module for translating calibration information between a field management system-compatible format and a common data format. The interface allows calibration information to flow between the calibrator and the field management system.

DETAILED DESCRIPTION OF THE PREFERRED EMBODIMENTS

Although the invention will be described with reference to specific embodiments of an improved interface for managing process calibrators, workers skilled in the art will recognize that changes can be made in form and detail without departing from the spirit and scope of the invention, which are defined by the appended claims.

A calibrator management system (CMS) module, generally designated as 10, is disclosed for establishing a data interface between a field management system (FMS) 12 and a calibrator 14 used to calibrate a field device 16. The CMS module 10 allows the FMS 12 to efficiently manage calibration information between the FMS 12 and the calibrator 14.

Figure 1:
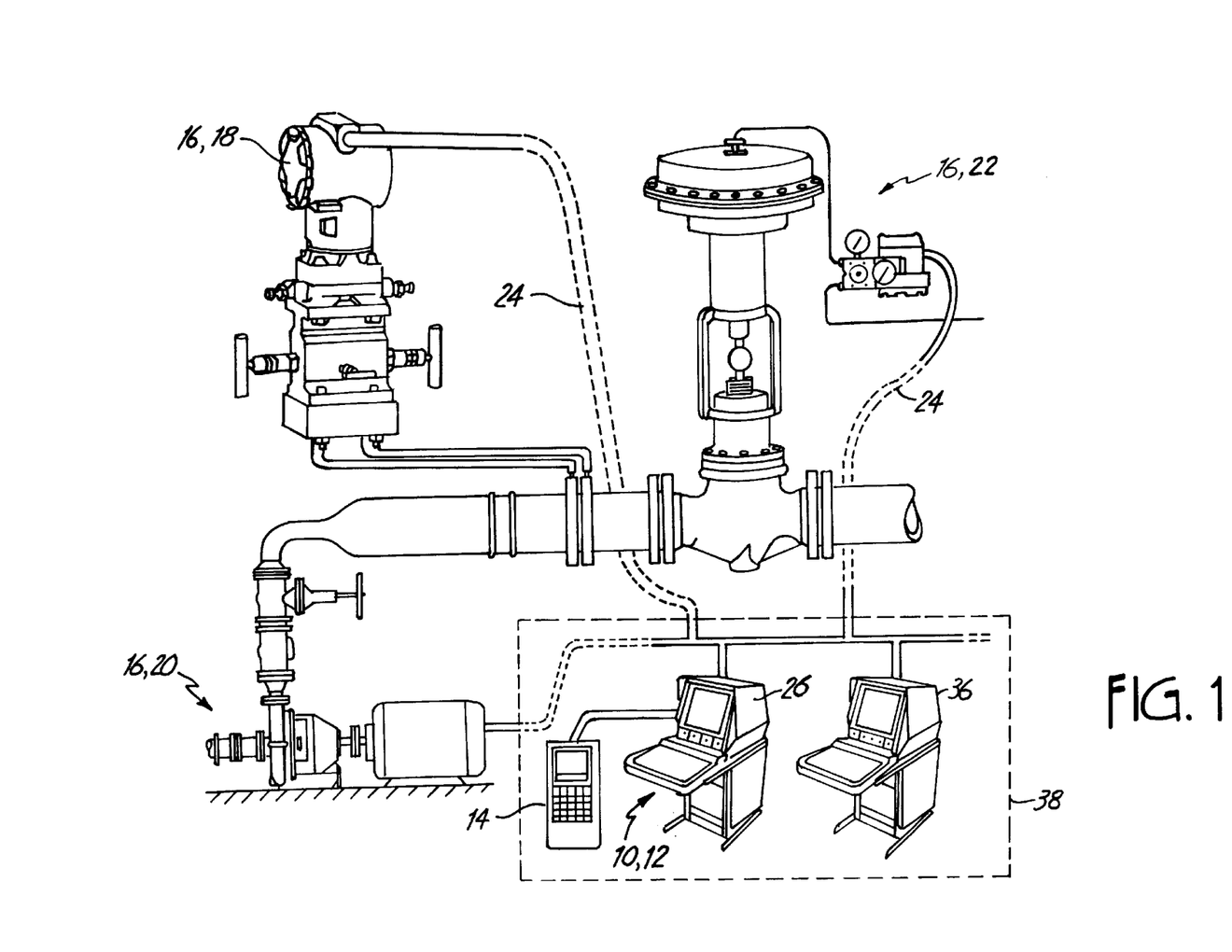
FIG. 1 is a diagram showing an environment of embodiments of the invention.
Figure 2:
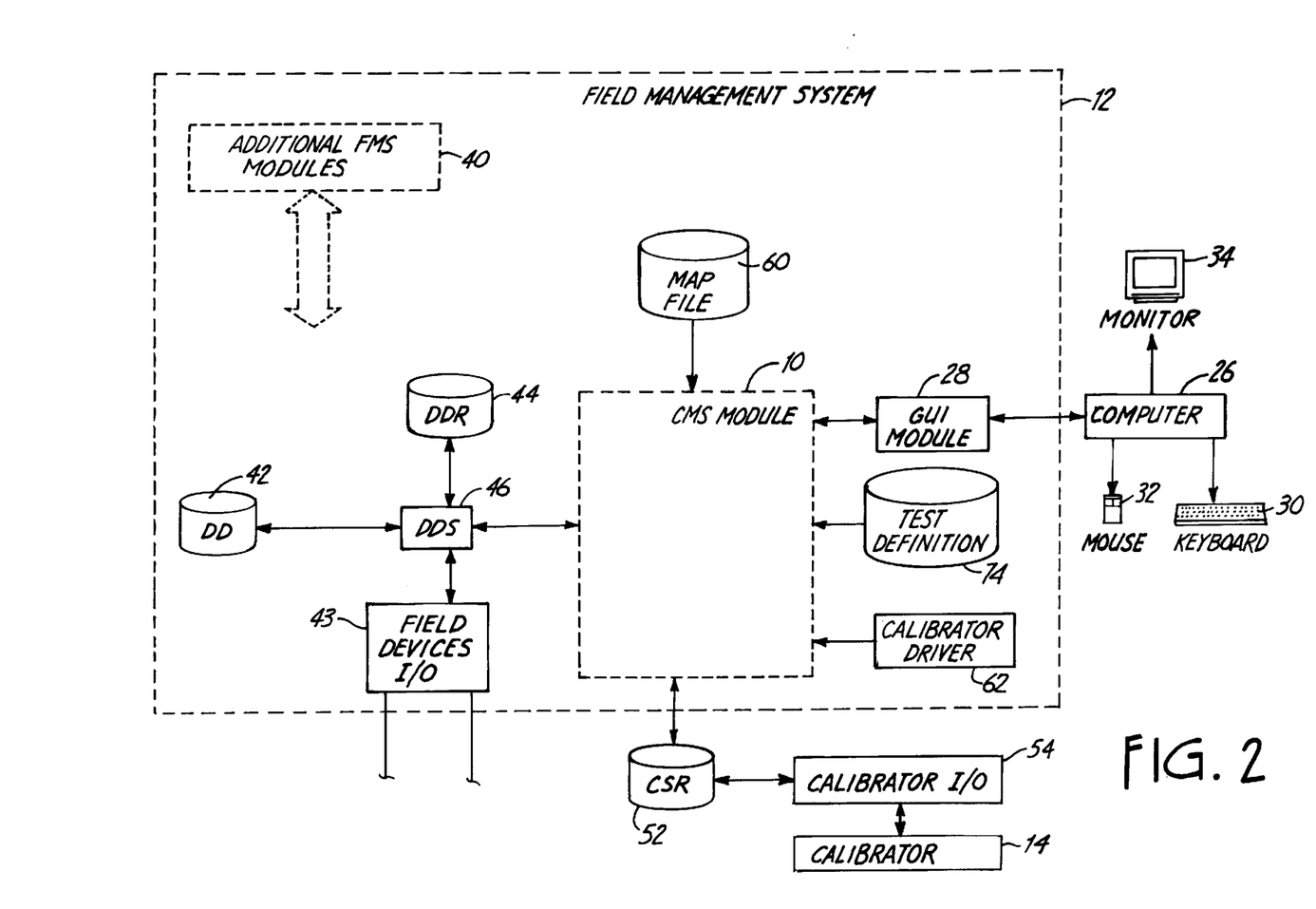
FIG. 2 is a simplified block diagram of an embodiment of the invention.

FIG. 1 is an environmental diagram of the invention depicting FMS 12 and calibrator 14 within a processing plant. FMS 12 generally manages remotely located field devices 16 such as process transmitter 18, and control devices 20, 22 through communication bus 24. Typically, FMS 12 runs on computer 26 having a graphical user interface (GUI) module 28 that receives input from keyboard 30 and mouse 32 and sends an output signal to monitor 34, as shown in FIGS. 1 and 2. Calibrator 14 is used to calibrate field devices 16 by performing various on-site tests on field devices 16 to determine their accuracy. Calibrator 14 is shown in FIG. 1 as being connected to FMS 12 for transference of calibration information between FMS 12 and calibrator 14 as will be discussed in more detail below, the calibration information can include testing data used by the calibrator 14 to test field devices 16 and test results from the testing of field devices 16 by calibrator 14.

Process transmitter 18, configured as a pressure transmitter, is shown in FIG. 1 connected to control system 36 located in control room 38. Process transmitter 18 can be associated with process variables relating to various process elements such as slurries, liquids, vapors and gasses generally found in a chemical, pulp, petroleum, gas, pharmaceutical, food, and other process plants. The monitored process variables can be pressure, flow, level, temperature or other process properties. Field devices 16 include one or more sensors that can be either internal to the transmitter or external to the transmitter, depending on the installation needs at the process plant. Process transmitters 18 generate one or more transmitter outputs that represent a sensed process variable or can also monitor the process using data received from remote sensors. Transmitter outputs are configured for transmission to control system 36 via communication bus 24. Control devices, such as pump control device 20 and valve control device 22, are actuated by control system 36 using communication bus 24. Bus 24 can be any type of communication link and can bridge across busses, which operate in accordance with multiple standards. Control system 36 can be, for example, a maintenance computer, an enterprise planning or monitoring system, a computerized maintenance measurement system, or a process control system.

FIG. 2 is a simplified block diagram of an FMS 12 which includes CMS module 10 of the present invention. FMS 12 can comprise several additional modules 40, each of which provide a particular function to FMS 12. FMS 12 maintains a database of device descriptions (DD's) 42, that contain information regarding specific field devices 16. DD's 42 are defined in accordance with a device description language. The DDL is a human readable language that provides a protocol for describing the data available from the device, the meaning of the data that can be retrieved from the device, the methods available for implementation of the device, the format for communicating with the device to obtain the data, and information for handling or interpreting other information related to the device such as calibration information. User interface information about the device, such as edit displays and menus, are stored in resource files or RC files. Additional information, such as calibration information, is also managed by FMS 12.

DD 42 source files are compiled into a binary format to produce the machine-readable device description, that can be provided to a user by the device manufacturer or a third-party developer to be stored in a host system, such as FMS 12. For some devices 16, such as, for example, in FOUNDATION™ Fieldbus or smart devices, DD 42 is stored in the smart device and transferred from the smart device to FMS 12 through field device I/O 43. When FMS 12 receives a DD 42 object file for a particular device 16, it can decode and interpret the DD 42 to derive a complete description of the interface with the device.

For descriptive purposes, device description records (DDR's) 44 are defined to contain information pertaining to devices 16 including the calibration information and the information stored in the DD-based records. Because DDR's 44 can comprise multiple data sources within FMS 12, each having different data formats, DDR's 44 are defined generally as being in accordance with a field management system-compatible (FMS-compatible) format. The FMS-compatible format generally describes the format used by FMS 12 to store device-specific information.

Accessing and managing DD's 42 by FMS 12 is generally accomplished through device description services (DDS) module 46, shown in FIG. 2. DDS module 46 is a general software system developed and provided by Fisher-Rosemount for automatically decoding and interpreting DD's 42 of devices 16. In embodiments of the invention, DDS 46 can also manage DDR's 44. DDS module 46, therefore, is a library of software routines which, when called by a host such as FMS 12, interprets DDR 44 of device 16 to provide the host with information pertaining to the device 16. This can include information pertaining to: (1) the setup and configuration of the device; (2) communication with the device; (3) user interfaces; (4) methods available for use in conjunction with the smart device; and (5) calibration information. One useful application of the DDS module 46 is in providing a consistent interface between a host system and one or more smart devices 16 having associated DD 42 source files or DDR's 44.

Figure 3:
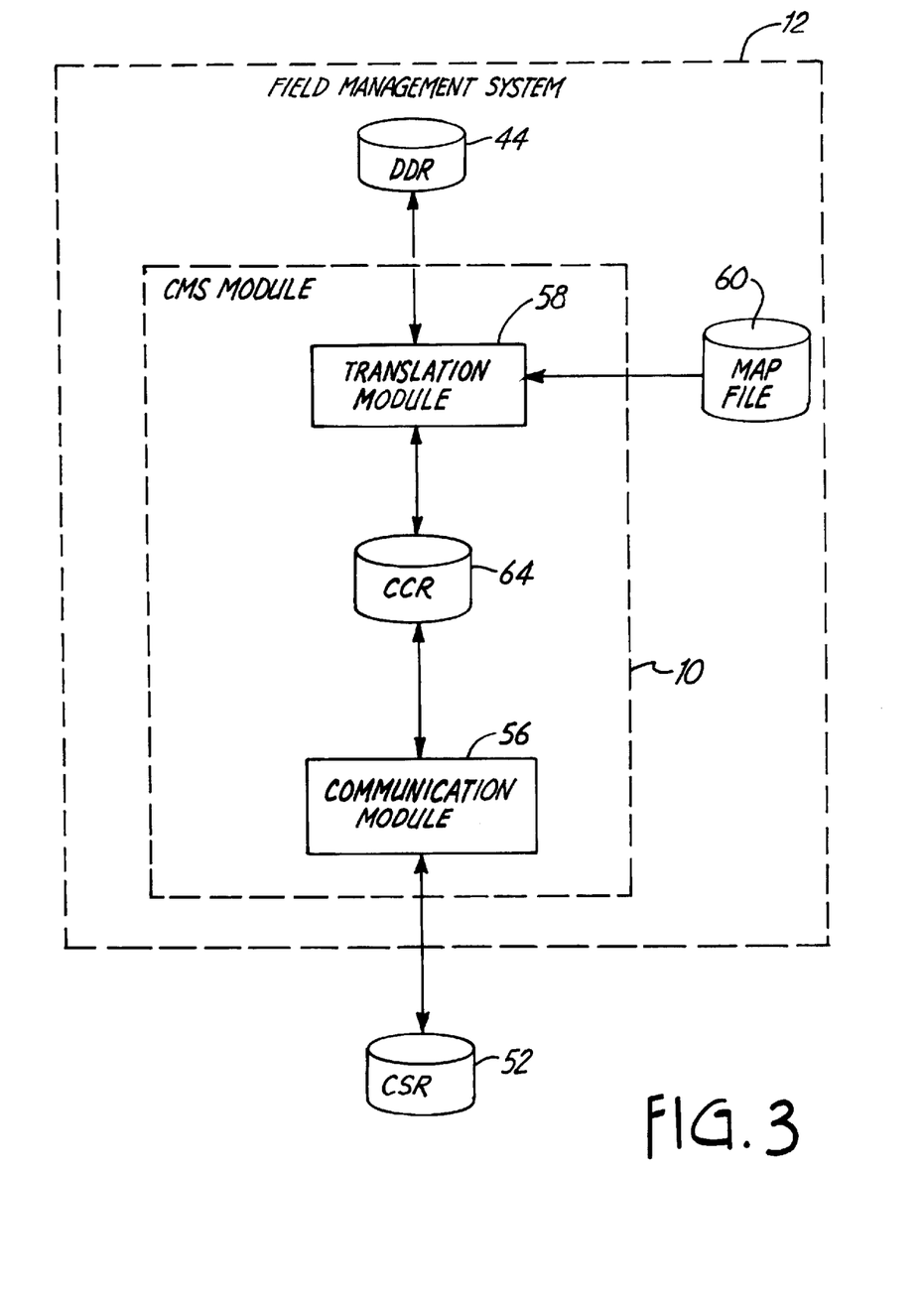
FIG. 3 is a block diagram of an embodiment of the calibrator management system module.

CMS module 10 includes translation module 58 and communication module 56, as shown in FIG. 3. CMS module 10 establishes a data interface between FMS 12 and calibrator 14 to allow for the exchange of data, including calibration information, between FMS 12 and calibrator 10, such as a Fluke® calibrator or other calibrator suitable for performing calibration routines on field devices 16.

Calibration information, generally in the form of testing data 48, is loaded into calibrator 14 before the testing of a field device 16 can commence. The testing data can include, for example, field device identification information, input block type information for selecting the parameters of device 16 to be read, parameter information for reading and writing the values for all information types that are relevant for the particular device 16, special parameter information for storing any special information about a parameter, default parameter values, and formulas for determining values of an information type. In addition, calibration information, generally in the form of test results 50, can be stored in calibrator 14 as a calibrator-specific record (CSR) 52 for later retrieval by FMS 12.

Translation module 58 transfers calibration information in a DDR 44 received from FMS 12 into a calibrator compatible record (CCR) 64. The DDR 44 is defined in accordance with the FMS-compatible format and the CCR 64 is defined in accordance with a common data format. The FMS-compatible format and the common data format are incompatible. As mentioned above, the FMS-compatible format generally describes the format used by FMS 12 to store device-specific information. The common data format can be any suitable format useable by multiple calibrator data formats. The common data format provides a uniform interface for the exchange of calibration information between a calibrator 14 and a calibrator management system. Translation module 58 overcomes the incompatibility of the FMS-compatible format and the common data format using map file 60 (described below).

Communication module 56 can be coupled to calibrator 14 and is configured to transfer at least some of the calibration information contained in a CCR 64 (described below) to calibrator 14 in accordance with a calibrator-specific protocol. The calibrator-specific protocol used by communication module 56 allows for the transfer of calibration information in the common data format into a calibrator-specific record (CSR) 52, which can be understood by calibrator 14. The calibrator-specific protocol is defined by calibrator driver 62 (shown in FIG. 2) which is provided to communication module 56 by FMS 12 (FIG. 2) or some other suitable source, or stored within communication module 56.

Calibrator driver 62 provides instructions to communication module 56 for transferring calibration information stored in CCR 64, defined in accordance with a common data format, into CSR 52 which can be recognized by calibrator 14. Additionally, calibrator driver 62 can provide instructions to communication module 56 for transferring calibration information in a CSR 52 into a CCR 64. These data transfers are indicated by the arrows in FIG. 3. Thus, communication module 56 can transfer calibration information in a CCR 64, received from translation module 58, to calibrator 14.

In another embodiment of CMS module 10, communication module 56 is configured to receive calibration information in accordance with a calibrator-specific protocol and to transfer the calibration information to translation module 58 in the common data format (e.g., CCR 64) as shown in FIG. 3. The translation module 58 translates the calibration information into the FMS-compatible format (DDR 44) before transferring the calibration information to the FMS 12. Here, the calibration information can include test results 50, which provide information related to the calibration of field device 16.

A physical calibrator input/output (I/O) 54, shown in FIG. 2, couples to calibrator 14 and allows calibration information to be transferred between calibrator 14 and CMS module 10. Several options exist for calibrator I/O 54 for providing the desired communications link with calibrator 14 including a serial connection, an infrared link, or any other suitable connections.

Figure 4:
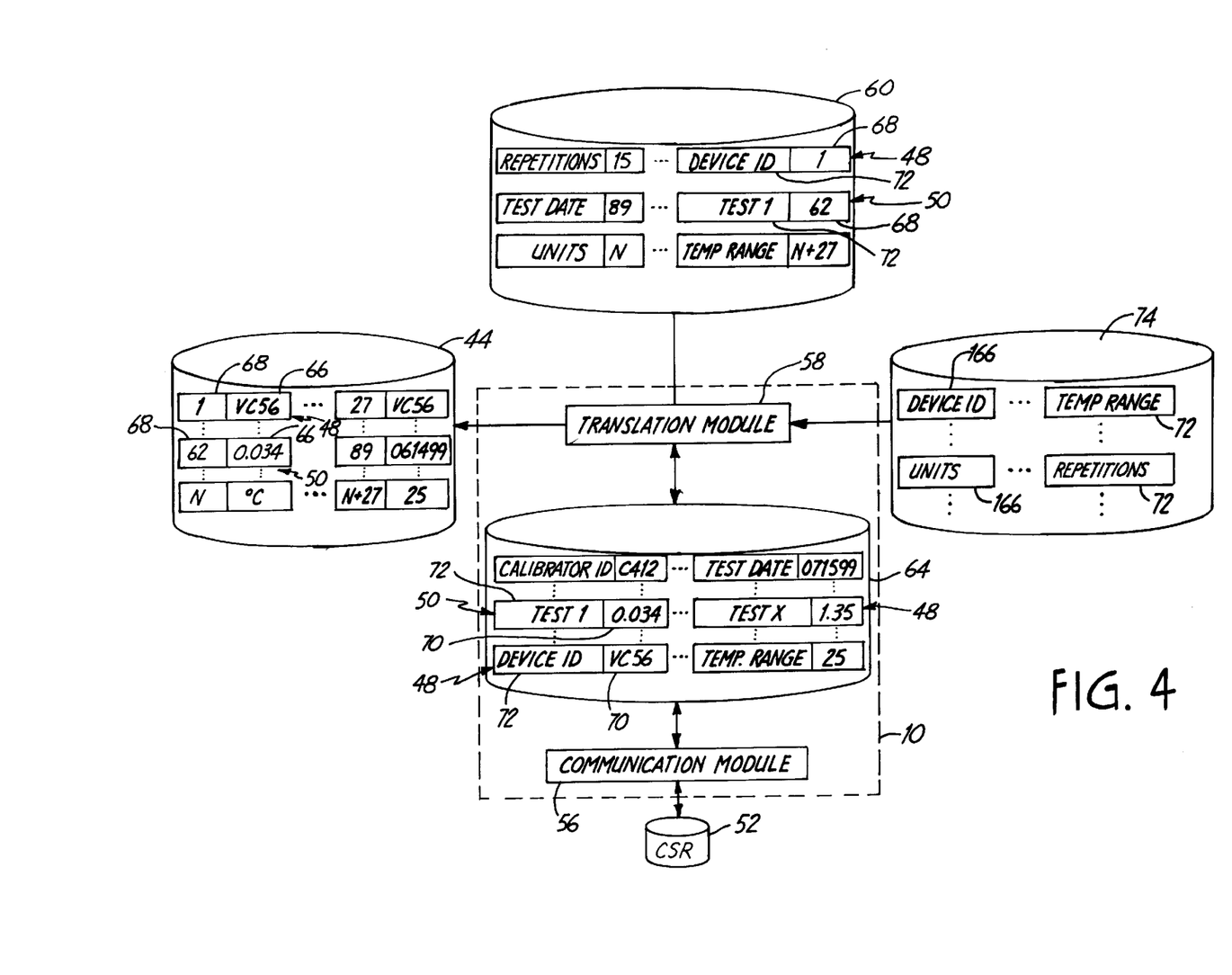
FIG. 4 is a simplified block diagram illustrating one method for transferring data between a field management system and a calibrator.

Referring now to FIG. 4, a more detailed discussion of the various data transformations is provided. DDR 44, defined in accordance with the FMS-compatible format, stores data, including calibration information, in a plurality of device data elements 66 that are identified by device data fields 68.

Similarly, CCR 64, defined in accordance with the common data format, stores data in a plurality of calibrator data elements 70 that are identified by calibrator data fields 72. Calibrator data elements 70 have corresponding device data elements 66 that contain related information. The device data elements 66 corresponding to the calibrator data elements 70 can be identified by locating device data fields 68 which correspond to calibrator data fields 72. Likewise, calibrator data elements 70 corresponding to device data elements 66 can be identified by locating calibrator data fields 72 which correspond to device data fields 68.

The FMS-compatible format and the common data format typically are discordant. As a result, FMS 12 cannot recognize data presented in the common data format and data presented to communication module 56 in the FMS-compatible format cannot be transferred to calibrator 14 in a recognizable form. Translation module 58 overcomes this obstacle using map files 60. Map files 60 are text files that define the relationship between the common data format and the FMS-compatible format by matching device data fields 68 of DDR's 44 to the corresponding calibrator data fields 72 of CCR's 64. As a result, translation module 58 can translate a DDR 44 in the FMS-compatible format into a CCR 64 in the common data format, and vice versa, using map file 60 by selectively transferring data between the corresponding data elements 66, 70.

Map files 60 are preferably provided to translation module 58 of CMS module 10 by FMS 12, as shown in FIGS. 2 and 3. Alternatively, map files 60 can be loaded into CMS module 10 from another suitable source or stored within CMS module 10. Since the calibration information required by calibrator 14 can vary from one field device to the next, there is generally one map file 60 for each field device 16. New map files 60 can be added to FMS 12 and existing map files 60 can be modified within FMS 12.

As mentioned above, calibration information in the form of testing data 48 must be loaded into calibrator 14 before the calibration of field device 16 can commence. Testing data 48 is defined by a test definition 74, shown in FIGS. 2 and 4, generally comprising a list of calibrator data fields 72 which identify calibrator data elements 70 required by calibrator 14 to perform the desired calibration. Test definition 74 can be stored in CMS module 10, or provided to translation module 58 by FMS 12 (FIG. 2), calibrator 14, or from any other suitable source. Accordingly, translation module 58 can selectively transfer the required calibration information or testing data 48 defined by test definition 74 from a DDR 44 of FMS 12 to a CCR 64 using map file 60.

Figure 5:
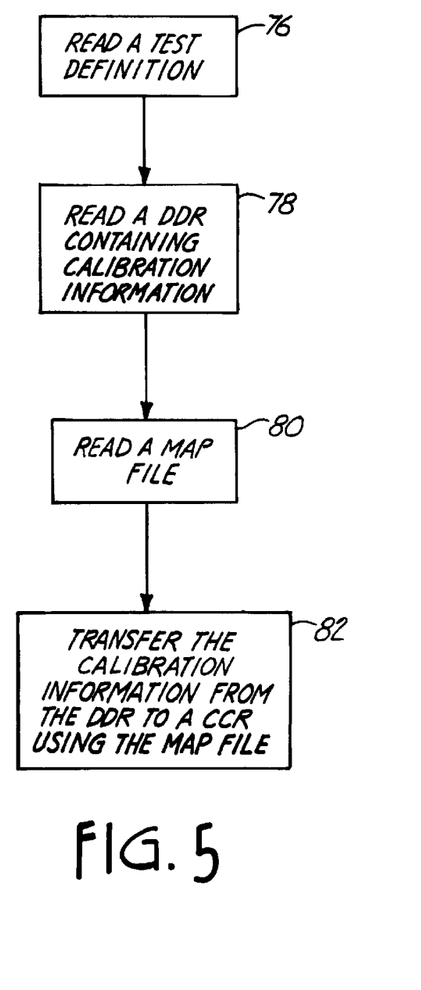
FIG. 5 is a flowchart of a translation of calibration information from a field management system compatible format to a common data format.

Referring to FIGS. 4 and 5, a method used by CMS module 10 to transfer calibration information from FMS 12 in the FMS-compatible format to a calibrator compatible format is shown. Translation module 58 reads test definition 74, map file 60, and DDR 44. The reading order can vary. Test definition 74 contains a list of calibrator data fields 72 of the calibration information, generally testing data 48, needed by calibrator 14, as mentioned above. Using map file 60, translation module 58 can locate device data fields 68 of DDR 44 that correspond to the list of calibrator data fields 72. The calibration information contained in device data elements 66 identified by device data fields 68 corresponding to the list of calibrator data fields 72 can then be transferred to the appropriate calibrator data elements 70 of CCR 64, as shown in FIG. 4. For example, the calibration data field 72 labeled "Device ID" stored in test definition 74 is mapped to the corresponding device data field 68 "1" in map file 60 and the testing data 48 "VC56" contained in the related device data element 66 can be transferred to the appropriate calibrator data element 70 of the CCR 64. This operation is shown to have been completed in FIG. 4. Following the transfer of the desired calibration information from DDR 44 to CCR 64, the calibration information can be transferred to calibrator 14 in accordance with the calibrator-specific protocol using the communication module 56.

Figure 6:
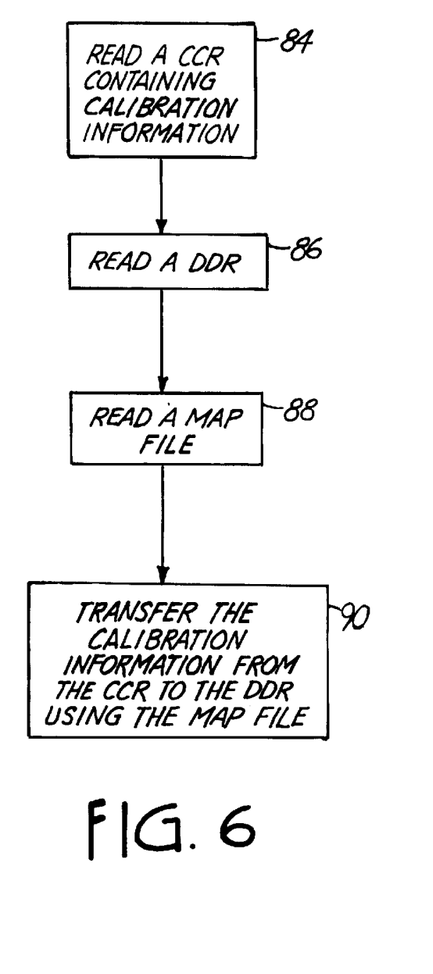
FIG. 6 is a flowchart of a translation of calibration information from a common data format to a field management system compatible format.

FIGS. 4 and 6 show a method used by CMS module 10 to transfer calibration information, generally test results 50, from calibrator 14 to the FMS 12. Here, communication module 56 receives CSR 52 from calibrator 14 that is translated into CCR 64 in accordance with the calibrator-specific protocol. Translation module 58 utilizes map file 60 to map calibrator data fields 72 of CCR 64 to their corresponding device data fields 68 of DDR 44 and transfers the calibration information contained in calibrator data elements 70 to their corresponding device data elements 66. For example, test result 50 stored in the calibrator compatible record 64 having the calibrator data field 72 "Test 1" and corresponding calibrator data element 70 "0.034" can be transferred to DDR 44 by locating the corresponding device data field 68 ("62") using map file 60 and transferring the test result 50 "0.034" to the appropriate device data element 66. This operation is shown to have been completed in FIG. 4. It is not necessary that all of the calibration information contained in CCR 64 be transferred to DDR 44. Accordingly, a test result definition (not shown) defining a list of device data fields 68 corresponding to the calibration information desired by DDR 44 could be used by translation module 58 to selectively transfer calibration information from the CCR 64 to the DDR 44 in the same fashion as test definition 74 is used to selectively transfer calibration information from DDR 44 to CCR 64.

FIG. 5 depicts a flowchart of blocks illustrating a routine used by CMS module 10 to translate calibration information in an FMS-compatible format into a common data format. In this embodiment, test definition 74 is read by CMS module 10 providing CMS module 10 with a list of calibrator data fields 72 corresponding to calibration information, such as testing data 48, in block 76. CMS module 10 reads DDR 44 defined in accordance with the FMS-compatible format, in block 78. DDR 44 contains the calibration information defined in test definition 74 in device data elements 66 that are identified by device data fields 68. In block 80, map file 60 is read. Map file 60 contains instructions for locating device data fields 68 of DDR 44 corresponding to the list of calibrator data fields 72 in test definition 74. In block 82, using map file 60, the calibration information is transferred from device data elements 66 identified by device data fields 68 corresponding to the list of calibrator data fields 72 of test definition 74 to CCR 64 defined in accordance with the common data format. As a result, this method acts to transfer calibration information in the FMS-compatible format to the common data format. Once the calibration information is transferred to CCR 64, the calibration information can be transferred to calibrator 14 in accordance with a calibrator-specific protocol as discussed above using communication module 56. The above-described method illustrates an embodiment of the invention and the precise order of the steps could be modified without affecting the desired outcome.

FIG. 6 is a flowchart of blocks illustrating a routine used by CMS module 10 to translate calibration information in the common data format to the FMS-compatible format. In this embodiment, CMS module 10 reads CCR 64 containing calibration information, generally test results 50, as shown in block 84. CCR 64 stores the calibration information in calibrator data elements 70 that are identified by calibrator data fields 72 as previously discussed. In block 86, CMS module 10 reads DDR 44, defined in accordance with the FMS-compatible format. DDR 44 comprises device data elements 66 which are identified by device data fields 68. In block 88, map file 60 is read. Map file 60 contains instructions for locating device data fields 68 of DDR 44 that correspond to calibrator data fields 72 of CCR 64. In block 90, using map file 60, the calibration information is transferred to device data elements 66 of DDR 44 which are identified by the device data fields 68 corresponding to the calibrator data fields 72 of the CCR 64. The calibration information can be transferred as individual data elements or groups of data elements.

The invention can be implemented in any type of computer system and does not need to be one that is directly coupled to a process control system. The particular computer systems are shown for illustration purposes only. Further, the invention is not limited to the particular data structure or module formats set forth herein. Those skilled in the art will recognize that computer software can be easily modified and is not limited to a particular configuration such as that set forth herein.

What is claimed is:

1. A calibrator management system module of a field management system (FMS), the calibrator management system module comprising:

a translation module configured to use a map file to transfer calibration information in a field management system-compatible (FMS-compatible) format into a common data format; and a communication module coupleable to a calibrator, the communication module configured to transfer the calibration information in the common data format to the calibrator in accordance with a calibrator-specific protocol.

2. The module of claim 1, wherein the calibration information includes testing data.

3. The calibrator management system module of claim 1, wherein:

the communication module is further configured to receive calibration information from the calibrator in accordance with the calibrator-specific protocol and to transfer the calibration information to the translation module in the common data format; and the translation module is further configured to, using the map file, translate the calibration information in the common data into the FMS-compatible format, the calibration information received from the calibrator can be recognized by the FMS.

4. The module of claim 3, wherein the calibration information includes test results.

5. The module of claim 1, wherein the calibration information is defined by a test definition.

6. The module of claim 1, wherein:

the calibration information in the FMS-compatible format is stored in device data elements of a device description record (DDR), the device data elements identified by device data fields; and the calibration information in the common data format is stored in calibrator data elements of a calibrator compatible record (CCR), the calibrator data elements identified by calibrator data fields which have corresponding device data fields of the DDR; wherein the map file contains instructions for locating the calibrator data fields of the CCR corresponding to the device data fields of the DDR.

7. The module of claim 6, wherein the calibration information is defined by a test definition containing a list of at least one of the calibrator data fields and the device data fields.

8. The module of claim 1, wherein the calibrator specific protocol is defined by a calibrator driver.

9. An apparatus for establishing a data interface between a field management system (FMS) and a calibrator used to calibrate a field device, the apparatus comprising:

a device description record (DDR) defined in accordance with a field management system-compatible (FMS-compatible) format, the DDR including device-specific information relating to the field device including calibration information;

a translation module configured to use the map file to transfer calibration information from the DDR to a calibrator compatible record (CCR) defined in accordance with a common data format;

a map file defining a relationship between the common data format and the FMS-compatible format; and a communication module configured to communicate with the calibrator and to transfer the calibration information in the common data format to the calibrator in accordance with a calibrator-specific protocol.

10. The apparatus of claim 9, wherein:

the device description language stores the calibration information in device data elements that are identified by device data fields, and wherein the common data format stores information in calibrator data elements that are identified by calibrator data fields; and the map file provides instructions for mapping the calibrator data fields to corresponding device data fields;

the translation module transfers the calibration information in the device data elements to the corresponding calibrator data elements of the calibrator compatible record using the map file.

11. The apparatus of claim 9, wherein the calibration information is defined by a test definition.

12. The apparatus of claim 9, wherein the translation module is further configured to transfer calibration information contained in a CCR to a DDR using the map file.

13. A method for translating data in a field management system-compatible (FMS-compatible) format into a common data format, the method comprising:

reading a test definition comprising a list of calibrator data fields defining calibration information;

reading a device description record (DDR) in the FMS-compatible format containing the calibration information in device data elements which are identified by device data fields;

reading a map file containing instructions for locating the device data fields corresponding to the list of calibrator data fields of the test definition; and transferring the calibration information, using the map file, from the device data elements identified by the device data fields corresponding to the list of calibrator data fields to a calibrator compatible record (CCR) defined in accordance with the common data format.

14. The method of claim 13, further comprising transferring the calibration information in the CCR to a calibrator for calibrating a field device.

15. The method of claim 14, wherein the transferring of the calibration information in the CCR to the calibrator is conducted in accordance with a calibrator-specific protocol.

16. The method of claim 13, wherein the calibration information is defined by a test definition.

17. A method for translating calibration information in a common data format into a field management system-compatible (FMS-compatible) format, the method comprising:

reading a calibrator compatible record (CCR) in the common data format containing the calibration information in calibrator data elements which are identified by calibrator data fields;

reading a device description record (DDR) in the FMS-compatible format comprising device data elements identified by device data fields;

reading a map file containing instructions for locating the device data fields corresponding to the calibrator data fields, the device data elements corresponding to the calibrator data elements can be determined; and transferring the calibration information, using the map file, from the calibrator data elements of the CCR to the corresponding device data elements of the DDR.

18. The method of claim 17, wherein the CCR is received from a calibrator, and wherein the calibration information contains test results.

19. A calibrator management system module of a field management system (FMS), the calibrator management system module comprising:

means for translating calibration information, using a map file, in a field management system-compatible (FMS-compatible) format into a common data format; and means for transferring the calibration information in the common data format to a calibrator in accordance with a calibrator-specific protocol.

20. The calibrator management system module of claim 19, wherein the means for translating is further configured for translating calibration information in the common data format into the FMS-compatible format, using the map file.

21. A computer readable medium having stored instructions executable by a processor capable of translating calibration information in a field management system-compatible (FMS-compatible) format into a common data format, the instructions comprising:

instructions for reading a test definition comprising a list of calibrator data fields defining calibration information;

instructions for reading a device description record in the FMS-compatible format containing calibration information in device data elements which are identified by device data fields;

instructions for reading a map file containing instructions for locating the device data fields corresponding to the list of calibrator data fields of the test definition;

instructions for transferring the calibration information, using the map file, from the device data elements identified by the device data fields corresponding to the list of calibrator data fields to a calibrator compatible record defined in accordance with a common data format.

22. A computer readable medium having stored instructions executable by a processor for translating calibration information in a common data format into a field management system-compatible (FMS-compatible) format, the instructions comprising:

instructions for reading a calibrator compatible record in the common data format containing the calibration information in calibrator data elements which are identified by calibrator data fields;

instructions for reading a device description record in the FMS-compatible format comprising device data elements identified by device data fields;

instructions for reading a map file containing instructions for locating the device data fields corresponding to the calibrator data fields, the device data elements corresponding to the calibrator data elements can be determined; and instructions for transferring the calibration information, using the map file, from the calibrator data elements of the calibrator compatible record to the corresponding device data elements of the device description record.

* * * * *

UNITED STATES PATENT AND TRADEMARK OFFICE
CERTIFICATE OF CORRECTION

PATENT NO.    : 6,330,517 B1
DATED         : December 11, 2001
INVENTOR(S)   : Dobrowski et al.

It is certified that error appears in the above-identified patent and that said Letters Patent is hereby corrected as shown below:

<u>Title page,</u>
Item [54], please correct the title with -- INTERFACE FOR MANAGING PROCESS CALIBRATORS --

Signed and Sealed this

Tenth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,330,517 B1
DATED         : December 11, 2001
INVENTOR(S)   : Patrick Dobrowski et al.

It is certified that error appears in the above-identified patent and that said Letters Patent is hereby corrected as shown below:

Title page,
Item [75] Inventors, replace "Partick Dobrowski" with -- Patrick Dobrowski --.

Signed and Sealed this

Twenty-first Day of January, 2003

JAMES E. ROGAN
*Director of the United States Patent and Trademark Office*